Dec. 29, 1936.                C. A. MARIEN                2,065,817
PISTON RING
Filed Sept. 28, 1935
FIG. 1.
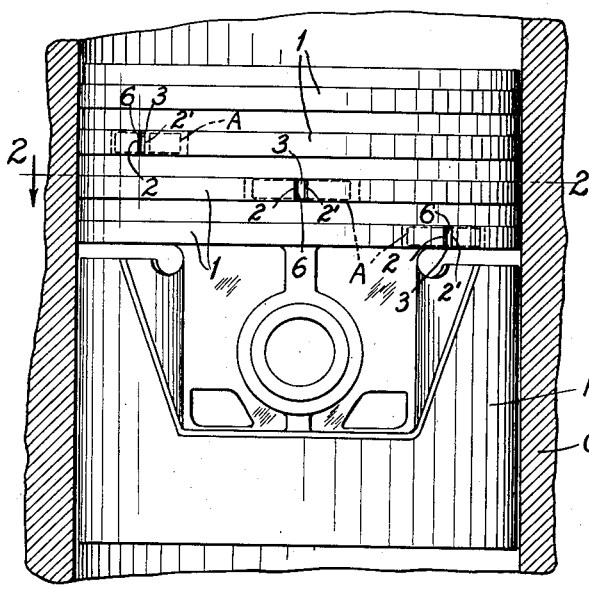
FIG. 2.
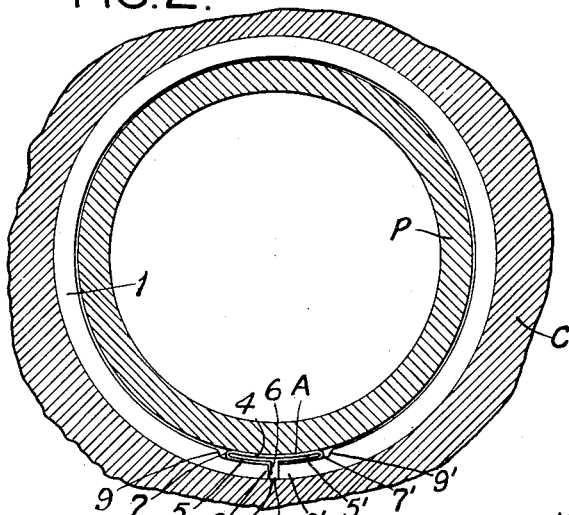
FIG. 8.
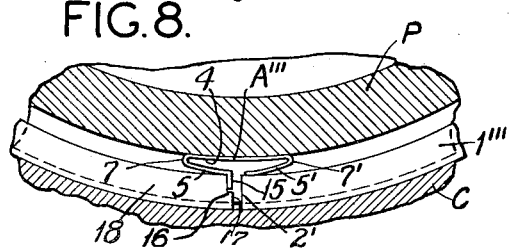
FIG. 3.
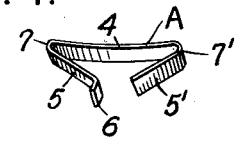
FIG. 4.
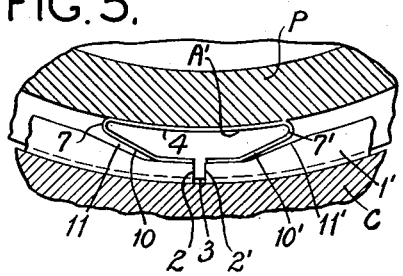
FIG. 5.
FIG. 6.
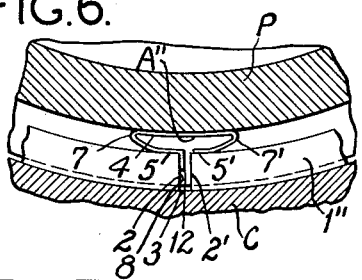
FIG. 7.
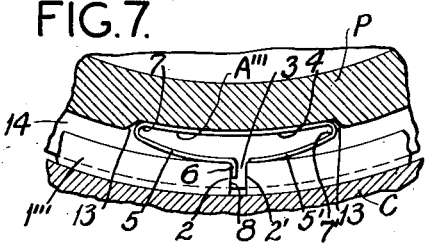
INVENTOR;
CHARLES A. MARIEN
BY Harry A. Benner
ATTORNEY Patented Dec. 29, 1936

2,065,817

UNITED STATES PATENT OFFICE 2,065,817

PISTON RING

Charles A. Marien, St. Louis, Mo., assignor to Ramsey Accessories Manufacturing Corporation, St. Louis, Mo., a corporation of Missouri Application September 28, 1935, Serial No. 42,555

1 Claim. (Cl. 309—41)

My invention has relation to improvements in piston rings for internal combustion engines and consists in the novel features of construction more fully set forth in the specification and pointed out in the claims.

The invention relates particularly to spring clips for association with the piston ring in a manner that it will engage the ends thereof and hold them in contact with the cylinder wall, at the same time permitting freedom of expansion and contraction in operation.

The principal object of the invention is to provide a spring clip for engagement with the ring ends, said clip having spring arms anchored beyond the ring ends and extending toward the ends so as not to impair the flexibility of the ring adjacent to its ends while it maintains the ends in contact with the cylinder wall. A further object of the invention is to provide means for holding the clip to the piston ring adjacent the ends thereof so that during the action of the piston it may not become dislodged.

Further and other advantages of my invention will be better apparent from a detailed description of the same in connection with the accompanying drawing, in which:

Figure 1 represents a side elevation of a piston within a cylinder, a fragment of the cylinder being shown in section, the piston rings of said piston being associated with my improved spring clip; Fig. 2 is a horizontal cross-sectional view taken on the plane indicated by the line 2—2 in Fig. 1; Fig. 3 is an enlarged sectional view similar to that shown in Fig. 2, only the ends of the piston ring and adjacent parts of the piston and cylinder being shown; Fig. 4 is a perspective view of my improved piston ring spring clip; and Figs. 5, 6, 7 and 8 are modifications of the invention in which the construction of the clip and the ring are somewhat varied.

Referring to the drawing, and for the present Figures 1 to 4, inclusive, P represents a conventional piston for operation within an engine cylinder C, said piston being equipped with piston rings 1, 1, 1, 1, the ends 2, 2' thereof being brought together to form a butt joint in which the usual gap 3 is provided to permit expansion and contraction of the ring in operation. It is a matter of common knowledge among those skilled in the art that the ends 2, 2' of the piston ring do not exert the same pressure against the cylinder wall that is exerted by other parts of the ring, and these ends are periodically forced away from the cylinder wall by the hydraulic action of the oil during the movements of the piston. The unseating of the ring ends therefore permits oil to pass the piston ring and at the same time causes what is known as a ring flutter, the ends of the ring vibrating rapidly during the high speed reciprocations of the piston.

In order to stabilize the ring ends 2, 2' and keep them in contact with the cylinder wall, thus eliminating the ring flutter, I have provided a spring clip A of a general triangular shape when in repose (see Fig. 4), said clip comprising a base portion 4, from the ends of which are bent spring arms 5, 5', the former having a lip 6 turned outwardly from its extremity. The clip A is of course made of spring steel and properly tempered so that a continual springing back and forth of the arms 5, 5' will not cause them to break off at their points of connections 7, 7' with the base 4 of the clip.

The clip A is inserted in the piston ring groove behind the ends 2, 2' of the ring so that the outwardly turned extremity 6 of the arm 5 engages against the end surface 8 of the ring extremity 2, while the end of the spring arm 5' bears against the inner surface of the piston ring close to the end surface of the extremity 2' thereof. It is essential that the clip A remain in the position shown in Fig. 3, in association with the ends 2, 2' of the ring 1, for obviously if it became dislodged therefrom it would no longer be in position to perform its function in connection with the ring extremities. The turned over end 6' will serve to hold the ring clip opposite the gap 3 of the ring 1 because circumferential movement of the clip relative to the ring will be confined to the width of the gap 3. However, the clip may be further confined, as shown in Fig. 3, by providing recesses 9, 9' on the inner surface of the ring 1 adjacent to the ends 2, 2' thereof and the spring arms 5, 5' disposed in said recesses. Obviously, either the recesses 9, 9' or the turned over extremity 6 of the ring clip may be dispensed with without impairing the function of the clip.

In Figure 5 I show the clip A' without any outwardly turned extremity on the spring arms 10, 10', the recesses 11, 11' being depended upon to hold the clip from relative movement away from the extremities of the piston ring 1'.

In Figure 6 I show a modification of the clip A" wherein the outwardly turned extremity 12 is depended upon to hold the clip in place without the addition of recesses in the ring 1".

In Figure 7 I show a clip A''' substantially the same as that shown in Fig. 3, except that a recess 13 is formed in the bottom of the piston ring groove 14 while there are no recesses formed in the extremities of the piston ring 1'''.

In Figure 8 I show a clip A''' similar to that shown in Fig. 7 in which the outwardly turned extremity 15 rests in a notch 16 cut into the end 17 of ring 18. The advantage of providing a notch 16 is that it permits the ends of the piston ring to come together until they are in abutting relation if necessary during the operation of the piston.

A spring clip, such as that herein described, provided with spring arms having their free extremities in contact with the extremities of the piston rings serves to hold the ring extremities in contact with the cylinder wall without impairing the resilience thereof. By having the spring arms engage at the very ends of the ring the fluttering of these ends is overcome without imposing such pressure on the ends as to impair the operation of the piston ring.

Having described my invention, I claim:

In combination, a piston having a ring groove, a split piston ring therein, the inner surface of the ring on opposite sides of the split being recessed and the ends of the ring being spaced to form a gap, and a spring clip disposed in the groove behind said gap, said clip having inwardly turned spring arms seated in said recess and bearing against the inner surface of the ring.

CHARLES A. MARIEN.